United States Patent
Yu

(10) Patent No.: US 10,949,077 B2
(45) Date of Patent: *Mar. 16, 2021

(54) INFORMATION PROCESSING METHOD AND DEVICE

(71) Applicant: Beijing Zhigu Rui Tuo Tech Co., Ltd, Beijing (CN)

(72) Inventor: Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 270 days.

This patent is subject to a terminal disclaimer.

(21) Appl. No.: 15/185,015

(22) Filed: Jun. 16, 2016

(65) Prior Publication Data

US 2016/0370932 A1   Dec. 22, 2016

(30) Foreign Application Priority Data

Jun. 19, 2015   (CN) .......................... 2015 1 0345013

(51) Int. Cl.
*G06F 3/041*     (2006.01)
*G06F 3/0488*    (2013.01)

(52) U.S. Cl.
CPC .......... *G06F 3/0488* (2013.01); *G06F 3/0412* (2013.01); *G06F 3/0416* (2013.01); *G06F 2203/04104* (2013.01)

(58) Field of Classification Search
CPC ... G06F 3/0484; G06F 3/04883; G06F 3/0416
(Continued)

(56) References Cited

U.S. PATENT DOCUMENTS 9,292,191 B2 *   3/2016   Kim ...................... G06F 3/0488
9,547,789 B2     1/2017   Park et al.
(Continued)

FOREIGN PATENT DOCUMENTS

CN   102262479 A   11/2011
CN   102810039 A   12/2012
(Continued)

OTHER PUBLICATIONS

"How do users hold mobile devices?" woshipm.com, Apr. 15, 2014, published online at [http://www.woshipm.com/ucd/78967.html], retrieved on May 19, 2017, 11 pages.
(Continued)

*Primary Examiner* — Benyam Ketema
(74) *Attorney, Agent, or Firm* — Amin, Turocy & Watson, LLP

(57) ABSTRACT

An information processing method and device are provided that relate to the field of information input. A method comprises: in response to that a user performs a touch-sensitive input operation on a touch screen of a device, acquiring contact areas between a gripping hand of the user and a side face of the device in different times; and at least in response to that the at least two contact areas satisfy a first predetermined condition, adjusting an input mode of the device. According to contact areas between a gripping hand of the user and a side face of the device, it can be inferred whether or not the user encounters inconvenient input and timely adjust an input mode of the device, which facilitates user input in the event of maintaining lower power consumption.

21 Claims, 4 Drawing Sheets

(58) Field of Classification Search
USPC ........................................................ 345/173
See application file for complete search history.

(56) References Cited

U.S. PATENT DOCUMENTS

| | | | |
|---|---|---|---|
| 9,588,643 B2* | 3/2017 | Miller | G06F 3/04886 |
| 9,600,704 B2 | 3/2017 | Benkley, III | |
| 9,742,902 B2 | 8/2017 | Shimuta | |
| 9,772,661 B2* | 9/2017 | Nakamura | G06F 1/1626 |
| 9,778,803 B2* | 10/2017 | Sato | G06F 3/045 |
| 9,798,399 B2 | 10/2017 | Vandermeijden et al. | |
| 9,886,116 B2 | 2/2018 | Parivar et al. | |
| 9,983,767 B2* | 5/2018 | Kim | G06F 3/0482 |
| 10,318,131 B2* | 6/2019 | Liang | G06F 3/0484 |
| 10,402,144 B2* | 9/2019 | Kuo | G06F 3/0418 |
| 10,705,644 B2* | 7/2020 | Karlo | G06F 3/0414 |
| 2005/0169503 A1 | 8/2005 | Howell et al. | |
| 2006/0140461 A1 | 6/2006 | Kim et al. | |
| 2006/0238517 A1* | 10/2006 | King | G06F 1/1626 |
| | | | 345/173 |
| 2009/0160792 A1 | 6/2009 | Morohoshi et al. | |
| 2010/0013780 A1 | 1/2010 | Ikeda et al. | |
| 2010/0044121 A1 | 2/2010 | Simon | |
| 2010/0079395 A1* | 4/2010 | Kim | G06F 1/1626 |
| | | | 345/173 |
| 2010/0085317 A1* | 4/2010 | Park | G06F 1/1626 |
| | | | 345/173 |
| 2010/0134424 A1* | 6/2010 | Brisebois | G06F 3/03547 |
| | | | 345/173 |
| 2011/0087963 A1* | 4/2011 | Brisebois | G06F 3/0485 |
| | | | 715/702 |
| 2011/0291970 A1* | 12/2011 | Liu | G06F 3/0416 |
| | | | 345/173 |
| 2012/0075194 A1 | 3/2012 | Ferren | |
| 2013/0019192 A1* | 1/2013 | Itoh | G06F 3/0346 |
| | | | 715/765 |
| 2013/0145316 A1* | 6/2013 | Heo | G06F 3/0488 |
| | | | 715/810 |
| 2013/0215060 A1* | 8/2013 | Nakamura | G06F 3/04883 |
| | | | 345/173 |
| 2014/0082514 A1* | 3/2014 | Sivaraman | G06F 3/04886 |
| | | | 715/745 |
| 2014/0168494 A1* | 6/2014 | Hong | G06F 1/1694 |
| | | | 348/333.01 |
| 2014/0289642 A1* | 9/2014 | Prasad | G06F 3/048 |
| | | | 715/745 |
| 2014/0370933 A1 | 12/2014 | Xie et al. | |
| 2015/0049901 A1* | 2/2015 | Seo | H04N 21/8358 |
| | | | 382/100 |
| 2015/0089386 A1* | 3/2015 | Brisebois | G06F 3/0488 |
| | | | 715/746 |
| 2015/0185983 A1* | 7/2015 | Yang | G06F 3/03547 |
| | | | 345/173 |
| 2015/0234581 A1* | 8/2015 | Terrero | G06F 3/04847 |
| | | | 715/863 |
| 2015/0355684 A1* | 12/2015 | Nakamura | G06F 1/1626 |
| | | | 361/679.3 |
| 2016/0179338 A1* | 6/2016 | Miller | G06F 3/04817 |
| 2017/0024597 A1* | 1/2017 | Cho | G06F 3/04883 |
| 2017/0300205 A1* | 10/2017 | Villa | G06F 3/0484 |

FOREIGN PATENT DOCUMENTS

| | | |
|---|---|---|
| CN | 103140822 A | 6/2013 |
| CN | 104468918 A | 3/2015 |
| CN | 101968710 A | 4/2015 |
| CN | 104536682 A | 4/2015 |
| CN | 104571880 A | 4/2015 |
| CN | 104714731 A | 6/2015 |

OTHER PUBLICATIONS

"Putin gift near the Russian-made smart phone screensaver set for the Chinese and Russian APEC theme", hinews.com, Nov. 10, 2014, published online at [http://www.hinews.cn/news/system/2014/11/10/017101240.shtml], retrieved on May 19, 2017, 4 pages.

Azenkot, Shiri, et al. "Input Finger Detection for Nonvisual Touch Screen Text Entry in Perkinput" Graphics Interface Conference, May 2012, published online at [http://faculty.washington.edu/wobbrock/pubs/gi-12.01.pdf], 9 pages.

"Unlocked", Jan. 8, 2014, published online at [http://app.cnmo.com/android/200639], retrieved on May 19, 2017, 3 pages.

Non-Final Office Action for U.S. Appl. No. 15/185,010 dated Mar. 9, 2018, 18 pages.

Non-Final Office Action for U.S. Appl. No. 15/185,013 dated Mar. 8, 2018, 17 pages.

Office Action for Chinese Application Serial No. 201510345013.7 dated Jan. 21, 2019, 7 pages.

Office Action for Chinese Application Serial No. 201510345011.8 dated Jan. 21, 2019, 5 pages.

Chinese Office Action dated Aug. 17, 2018 for Chinese Patent Application No. 201510347541.6, 15 pages (with translation).

Office Action dated Oct. 4, 2018 for U.S. Appl. No. 15/185,013, 34 pages.

Office Action dated Oct. 4, 2018 for U.S. Appl. No. 15/185,010, 37 pages.

Final Office Action received for U.S. Appl. No. 15/185,010 dated Apr. 18, 2019, 46 pages.

Final Office Action received for U.S. Appl. No. 15/185,013 dated Apr. 30, 2019, 50 pages.

* cited by examiner

INFORMATION PROCESSING METHOD AND DEVICE

RELATED APPLICATION

The present application claims the benefit of priority to Chinese Patent Application No. 201510345013.7, filed on Jun. 19, 2015, and entitled "Interaction Method between Pieces of Equipment and User Equipment", which application is hereby incorporated into the present application by reference herein in its entirety.

TECHNICAL FIELD

The present application relates to the field of information input, and, for example, to an information processing method and device.

BACKGROUND

With popularization of electronic devices, a growing number of touch screen devices such as smartphones and tablet computers enter into people's life, which greatly enriches people's life.

On a large touch screen phone, when only one hand (the other hand is occupied by other affairs) of the user can be configured to interact with a handheld device, it is possible to result in that the input process is slow and the input efficiency is lower as a region to be touched is too distant. To increase the input efficiency, some devices, in addition to touch-sensitive input, provide more modal input manners, for example, input information is received by detecting eye movement, blowing air streams and the like.

The more modal input manners, if opened all the time, may lead to excessive device power consumption and affect endurance time.

SUMMARY

An example, non-limiting objective of the present application is to provide an information processing method and device.

According to one aspect of at least one example embodiment of the present application, an information processing method is provided, the method comprising:

in response to that a user performs a touch-sensitive input operation on a touch screen of a device, acquiring at least two contact areas between a gripping hand of the user and a side face of the device in different times; and at least in response to that the at least two contact areas satisfy a first predetermined condition, adjusting an input mode of the device.

According to another aspect of at least one example embodiment of the present application, an information processing device is provided, the device comprising:

a first acquisition module, configured to, in response to that a user performs a touch-sensitive input operation on a touch screen of a device, acquiring at least two contact areas between a gripping hand of the user and a side face of the device in different times; and an adjustment module, configured to, at least in response to that the at least two contact areas satisfy a first predetermined condition, adjusting an input mode of the device.

According to another aspect of at least one example embodiment of the present application, a user equipment is provided, the equipment comprising:

a touch screen;

a memory, configured to store an instruction;

a processor, configured to execute the instruction stored in the memory, the instruction causing the processor to perform the following operations of:

in response to that a user performs a touch-sensitive input operation on a touch screen of a device, acquiring at least two contact areas between a gripping hand of the user and a side face of the device in different times; and at least in response to that the at least two contact areas satisfy a first predetermined condition, adjusting an input mode of the device.

The information processing method and device according to example embodiments of the present application, in response to that a user performs a touch-sensitive input operation on a touch screen of a device, acquire at least two contact areas between a gripping hand of the user and a side face of the device in different times; and at least in response to that the at least two contact areas satisfy a first predetermined condition, adjust an input mode of the device. The method and device, according to at least two contact areas between a gripping hand of the user and a side face of the device, infer whether or not the user encounters inconvenient input and timely adjust an input mode of the device, which facilitates user input.

DETAILED DESCRIPTION

Example embodiments of the present application are further described below in detail with reference to the accompanying drawings and embodiments. The following embodiments are used for describing the present application, but are not intended to limit the scope of the present application.

It should be understood by a person skilled in the art that, in the embodiments of the present application, the value of the serial number of each step described below does not mean an execution sequence, and the execution sequence of each step should be determined according to the function and internal logic thereof, and should not be any limitation to the implementation procedure of the embodiments of the present application.

When a gripping hand of a user performs touch-sensitive input on a large-screen device (e.g., a mobile phone or a tablet PC), if input is inconvenient, for example, the position to be touched is too distant, the gesture of the gripping hand may be changed habitually, for example, the gripping hand is moved towards the position to be touched.

Meanwhile, existing electronic devices generally have lots of input manners in addition to the touch-sensitive input and their input regions may also be adjusted, for example, the input manner may also be voice input, or image input is acquired through a camera, airflow input blown by the user is received and the like. The input manners may be used as important supplements to the touch-sensitive input, which provides more input options for the user in the event that the user's touch-sensitive input encounters inconvenient input. However, the input manners generally have higher power consumption, and opening all the time will seriously affect endurance and computing performance of the device.

The present application achieves an information processing method based on the usage habits, so as to adjust an input mode of the device at a reasonable time, which reduces power consumption while facilitating user input.

Figure 1:
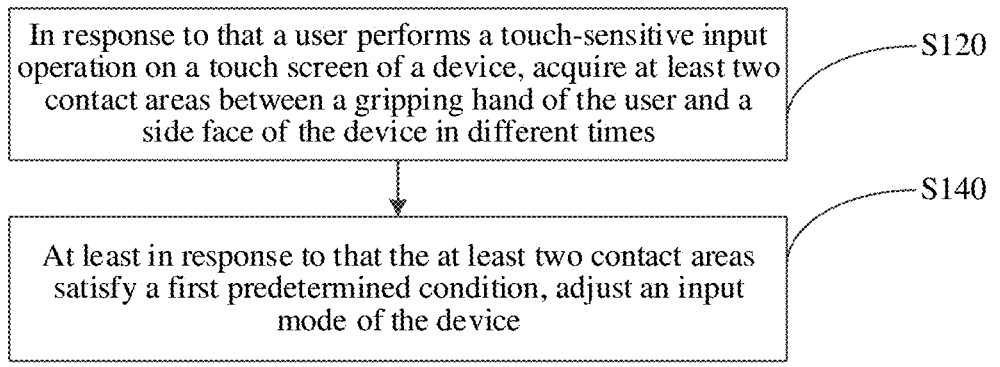
FIG. 1 is a flowchart of the information processing method according to an example embodiment of the present application.

FIG. 1 is a flowchart of the information processing method according to an embodiment of the present application; the method may be implemented on, for example, an information processing device. As shown in FIG. 1, the method comprises:

S120: in response to that a user performs a touch-sensitive input operation on a touch screen of a device, acquiring at least two contact areas between a gripping hand of the user and a side face of the device in different times; and S140: at least in response to that the at least two contact areas satisfy a first predetermined condition, adjusting an input mode of the device.

The method according to the embodiment of the present application, in response to that a user performs a touch-sensitive input operation on a touch screen of a device, acquires at least two contact areas between a gripping hand of the user and a side face of the device in different times; and at least in response to that the at least two contact areas satisfy a first predetermined condition, adjusts an input mode of the device. The method, according to at least two contact areas between a gripping hand of the user and a side face of the device, infer whether or not the user encounters inconvenient input and timely adjust an input mode of the device, which facilitates user input.

Functions of steps S120 and S140 are described below in detail with reference to example embodiments.

S120: In response to that a user performs a touch-sensitive input operation on a touch screen of a device, acquire at least two contact areas between a gripping hand of the user and a side face of the device in different times.

The device may be any electronic device comprising the touch screen, which, for example, may be a smartphone, a tablet computer, a wearable device or the like.

The touch screen may be any types of touch screens such as a vector pressure sensing technology touch screen, a resistance technology touch screen, a capacitance technology touch screen, an infrared technology touch screen and a surface acoustic wave technology touch screen.

The touch-sensitive input operation is a click input operation of a control finger of the user on the touch screen, which is not limited to the user's single click, and may be a series of clicking operations, for example, the user continuously clicks multiple times during the game.

Figure 2:
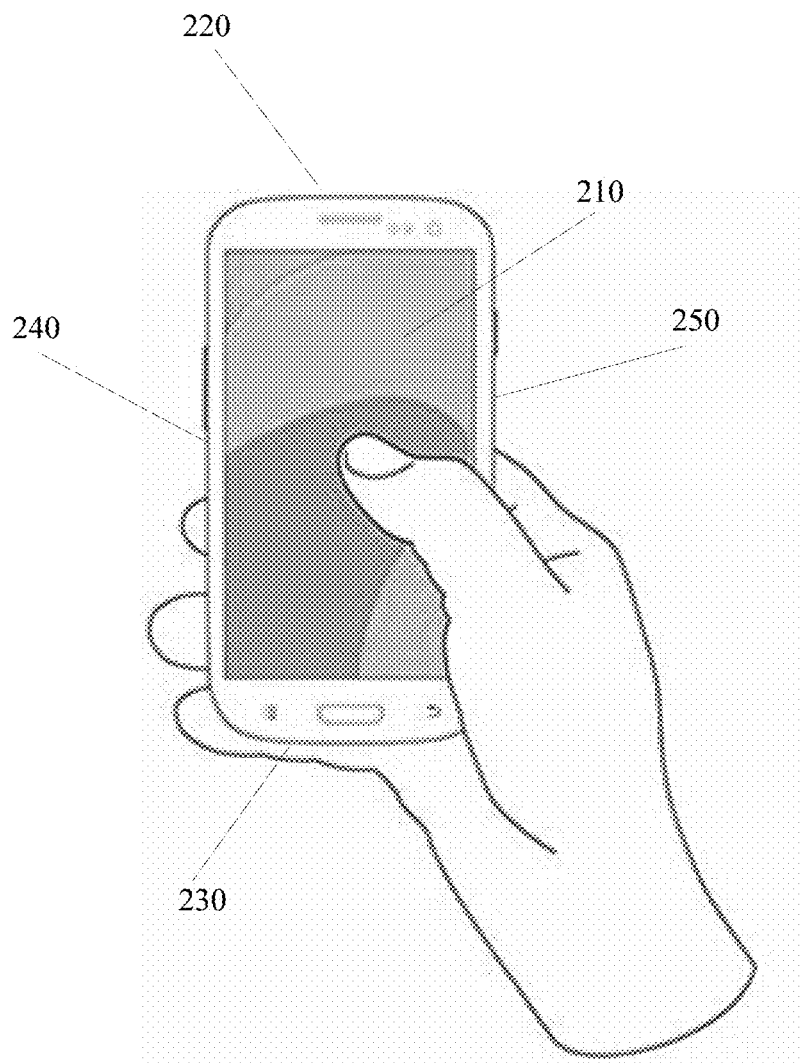
FIG. 2 is a schematic diagram showing that a user grips a mobile phone with one hand in one example embodiment of the present application.

The side face of the device may be any face of the device except the front and the back, which, for example, may be an upper side face, a lower side face, a left side face or a right side face of the device. As shown in FIG. 2, when the user grips a smartphone with the right hand, one side pressed by his thumb is the front 210 of the smartphone, opposite the front 210 is the back, the upper side of the front is an upper side face 220, the lower side of the front is a lower side face 230, the left side of the front is an upper side face 240, and the right side of the front is a right side face 250.

The contact area may be acquired by using a corresponding sensor located on the side face, for example, the sensor may be a pressure sensor, or in the event that the side face of the device is also a touch screen, it is feasible to directly use the touch screen on the side face for acquisition.

In one example embodiment, step S120 may further comprise:

S120': in response to that the gripping hand of the user performs the touch-sensitive input operation for different positions of the touch screen, acquiring the at least two contact areas.

In the example embodiment, only when the gripping hand performs the touch-sensitive input operation for different positions of the touch screen, can the method be begun, and then it is possible to adjust the input mode of the device. Thus, it is possible to overcome the problem that execution of the method may lead to false triggering under some circumstances. For example, in the event that one hand grips the device while the other hand touches and inputs, or in the event that the touch-sensitive position of the control hand is kept unchanged, the method may not be performed.

S140: At least in response to that the at least two contact areas satisfy a first predetermined condition, adjust an input mode of the device.

The adjusting an input mode of the device may comprise: adjusting an input manner and/or an input region of the device.

The input manner may comprise: touch-sensitive input, voice input, image input, airflow input, bending deformation input and the like. The image input, for example, may achieve input by detecting eye movement. The airflow input, for example, may achieve input by detecting airflow blown by the user to the device. The bending deformation input, for example, may achieve input by changing the shape of the device. The adjusting an input manner herein may be opening more input manners, for example, while the touch-sensitive input has been opened, the voice input is opened; or, it is also feasible to switch input manners, for example, the input manner is switched from the touch-sensitive input to the voice input.

The adjusting an input region of the device, for example, may be adjusting full-screen input to region input, for example, a screen region close to the control finger of the user is set as an input region, to facilitate user input.

In one example embodiment, step S140 may comprise:

S141: determining area difference related information according to the at least two contact areas; and S142: in response to that the area difference related information satisfies a second predetermined condition, adjusting the input mode of the device.

In step S141, the area difference related information may be multiple area differences corresponding to the at least two contact areas, for example, an area difference corresponding to each two contact areas between the gripping hand and the side face; the area difference related information may also be the variance of the multiple area differences.

In one example embodiment, step S142 may comprise:

S1421: determining a maximum area difference according to the area difference related information; and S1422: in response to that the maximum area difference is greater than a threshold, adjusting the input mode of the device.

In step S1421, it is feasible to select the maximum one from the multiple area differences as the maximum area difference.

In step S1422, it is feasible to adjust the input mode of the device in the event that the maximum area difference is greater than a threshold. That is to say, if the area difference of any two contact areas between the gripping hand and the side face is great enough, it is considered that the corresponding condition is satisfied, and then it is inferred that it is inconvenient for the user to make current input and it is necessary to adjust the input mode.

In another example embodiment, step S142 may comprise:

S142': in response to that a classification result of the area difference related information based on a classifier is that it is necessary to adjust the input mode of the device, adjusting the input mode of the device.

In the example embodiment, in essence, the area difference related information is classified based on a classifier, and a classification result is obtained, the classification result comprising: it is necessary to adjust the input mode of the device, or it is not necessary to adjust the input mode of the device. In the event that the classification result is that it is necessary to adjust the input mode of the device, the input mode of the device is adjusted.

The classifier may be generated based on training data of the user, for example, in the training stage, contact areas between the gripping hand of the user and the side face within a period of time are recorded, multiple area differences and/or the variance of the multiple area differences are obtained through calculation, and then the multiple area differences and/or the variance of the multiple area differences as well as a corresponding classification mark are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a support vector machine (SVM) or a decision tree.

In another example embodiment, the method may further comprise:

S131: acquiring at least two touch-sensitive positions corresponding to the touch-sensitive input operation; and S132: determining touch-sensitive distance related information according to the at least two touch-sensitive positions.

Step S142 further comprises:

S142": in response to that a classification result of the area difference related information and the touch-sensitive distance related information based on a classifier is that it is necessary to adjust the input mode of the device, adjusting the input mode of the device.

A main difference between the example embodiment and the previous example embodiment is that the classifier increases classification on the touch-sensitive distance related information.

The touch-sensitive distance related information may comprise the distance between each two in the at least two touch-sensitive positions, which, in essence, reflects the size of the region that the user needs to touch currently; evidently, the greater the distance is, the greater the region is, and correspondingly, it is more possible that the user encounters inconvenient input; on the contrary, if the distance is smaller, for example, the user clicks one position multiple times, the user generally may not encounter inconvenient input (even if it is inconvenient, the user may also easily overcome it through one hold adjustment, and generally it is not necessary to adjust the input mode). Therefore, in the example embodiment, the area difference related information and the touch-sensitive distance related information are classified at the same time, and the classification result may be more accurate.

In the example embodiment, the classifier may also be generated based on training data of the user, for example, in the training stage, contact areas between the gripping hand of the user and the side face within a period of time are recorded, multiple area differences corresponding to the gripping hand are obtained through calculation, touch-sensitive positions of the user for the touch screen within the period of time are recorded at the same time, the area differences between each two touch-sensitive positions are obtained through calculation, and then the multiple area differences and/or the variance of the multiple area differences, the touch-sensitive distances as well as a corresponding classification mark are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

As stated previously, it is feasible to obtain the area difference related information according to the at least two contact areas between the gripping hand and the side face in different times, and then it is feasible to determine whether it is necessary to adjust the input mode currently based on a pre-trained classifier. It can be considered that the area difference related information directly decides whether it is necessary to adjust the input mode, and at the same time, the at least two contact areas between the gripping hand and the side face of the device in different times decide the area difference related information. Therefore, in one example embodiment, it is feasible to determine whether it is necessary to adjust the input mode directly according to the at least two contact areas and the corresponding classifier. In the example embodiment, step S140 further comprises:

S140': in response to that a classification result of the at least two contact areas based on a classifier is that it is necessary to adjust the input mode of the device, adjusting the input mode of the device.

In the example embodiment, the classifier may also be generated based on training data of the user, for example, in the training stage, contact areas between the gripping hand of the user and the side face within a period of time are recorded, and corresponding classification marks are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

As stated previously, the touch-sensitive distance related information may also affect accuracy of the classification result, and the touch-sensitive positions decide the touch-sensitive distance related information; in another example embodiment, the method further comprises:

S130": acquiring at least two touch-sensitive positions corresponding to the touch-sensitive input operation; and Step S140 further comprises:

S140": in response to that a classification result of the at least two contact areas and the at least two touch-sensitive positions based on a classifier is that it is necessary to adjust the input mode of the device, adjusting the input mode of the device.

In the example embodiment, the classifier may also be generated based on training data of the user, for example, in the training stage, contact areas between the gripping hand of the user and the side face within a period of time are recorded, touch-sensitive positions of the user's control hand for the touch screen within the period of time are recorded at the same time, and then the contact areas, the touch-sensitive positions as well as a corresponding classification mark are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

Under some circumstances, after the user performs the touch-sensitive input operation, in a next period of time, it is not necessary to input information; in this case, if the input mode of the device is adjusted, display is not necessary. Therefore, in one example embodiment, step S140 may further comprise:

S140''': in response to that the at least two contact areas satisfy the first predetermined condition and that input receiving state information of the device satisfies a third predetermined condition, adjusting the input mode of the device.

The input receiving state information may be directly acquired from the device, which reflects whether the device is preparing to receive user input currently. For example, the device currently displays one input region, and evidently, the device is preparing to receive user input currently; on the contrary, if the device is currently in a lock-screen state, the device generally does not prepare to receive user input.

In the example embodiment, the third predetermined condition may be that the input receiving state information displays that the device is preparing to receive user input currently.

In addition, an embodiment of the present application further provides a computer readable medium, comprising a computer readable instruction that performs the following operations when being executed: performing the operations of steps S120 and S140 of the method in the example embodiment shown in FIG. 1.

To sum up, the method, according to at least two contact areas between a gripping hand of the user and a side face of the device, as well as touch-sensitive positions of the user for the touch screen and input receiving state information of the device, infers whether or not the user encounters inconvenient input and timely adjusts an input mode of the device, thus facilitating user input in the event of maintaining lower power consumption.

Figure 3:
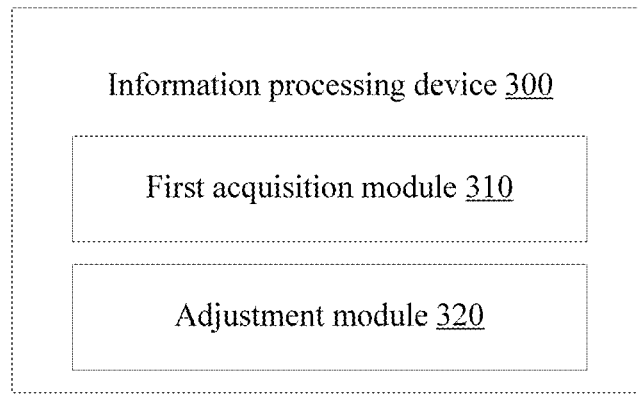
FIG. 3 is a module diagram of the information processing device according to an example embodiment of the present application.

FIG. 3 is a schematic diagram of a module structure of the information processing device according to an embodiment of the present application; the information processing device may be disposed in a user equipment such as a smartphone as a functional module, and certainly may also be used by the user as a separate terminal device. As shown in FIG. 3, the information processing device 300 may comprise:

a first acquisition module 310, configured to, in response to that a user performs a touch-sensitive input operation on a touch screen of a device, acquire at least two contact areas between a gripping hand of the user and a side face of the device in different times; and an adjustment module 320, configured to, at least in response to that the at least two contact areas satisfy a first predetermined condition, adjust an input mode of the device.

The information processing device according to the embodiments of the present application, in response to that a user performs a touch-sensitive input operation on a touch screen of a device, acquires at least two contact areas between a gripping hand of the user and a side face of the device in different times; and at least in response to that the at least two contact areas satisfy a first predetermined condition, adjusts an input mode of the device. The information processing device, according to at least two contact areas between a gripping hand of the user and a side face of the device, infer whether or not the user encounters inconvenient input and timely adjust an input mode of the device, which facilitates user input.

The information processing device may be the same as the device and may also be different from the device. In the case that they are different, the information processing device may communicate with the device, to acquire information such as the at least two contact areas.

Functions of the first acquisition module 310 and the adjustment module 320 are described below in detail with reference to example embodiments.

The first acquisition module 310, configured to, in response to that a user performs a touch-sensitive input operation on a touch screen of a device, acquire at least two contact areas between a gripping hand of the user and a side face of the device in different times.

The device may be any electronic device comprising the touch screen, which, for example, may be a smartphone, a tablet computer, a wearable device or the like.

The touch screen may be any types of touch screens such as a vector pressure sensing technology touch screen, a resistance technology touch screen, a capacitance technology touch screen, an infrared technology touch screen and a surface acoustic wave technology touch screen.

The touch-sensitive input operation is a click input operation of a control finger of the user on the touch screen, which is not limited to the user's single click, and may be a series of clicking operations, for example, the user continuously clicks multiple times during the game.

The side face of the device may be any face of the device except the front and the back, which, for example, may be an upper side face, a lower side face, a left side face or a right side face of the device.

The contact area may be acquired by using a corresponding sensor located on the side face, for example, the sensor may be a pressure sensor, or in the event that the side face of the device is also a touch screen, it is feasible to directly use the touch screen on the side face for acquisition.

In one example embodiment, the first acquisition module 310 is configured to, in response to that the gripping hand of the user performs the touch-sensitive input operation for different positions of the touch screen, acquire the at least two contact areas.

In the example embodiment, only when the gripping hand performs the touch-sensitive input operation for different positions of the touch screen, can the method be begun, and then it is possible to adjust the input mode of the device. Thus, it is possible to overcome the problem that execution of the method may lead to false triggering under some circumstances. For example, in the event that one hand grips the device while the other hand touches and inputs, or in the event that the touch-sensitive position of the control hand is kept unchanged, the method may not be performed.

The adjustment module 320, configured to, at least in response to that the at least two contact areas satisfy a first predetermined condition, adjust an input mode of the device.

The adjusting an input mode of the device may comprise: adjusting an input manner and/or an input region of the device.

The input manner may comprise: touch-sensitive input, voice input, image input, airflow input, bending deformation input and the like. The adjusting an input manner herein may be opening more input manners, for example, while the touch-sensitive input has been opened, the voice input is opened; or, it is also feasible to switch input manners, for example, the input manner is switched from the touch-sensitive input to the voice input.

The adjusting an input region of the device, for example, may be adjusting full-screen input to region input, for example, a screen region close to the control finger of the user is set as an input region, to facilitate user input.

Figure 4:
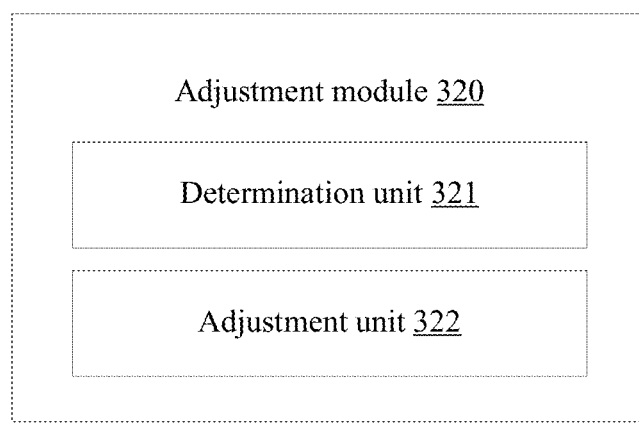
FIG. 4 is a module diagram of the adjustment module in one example embodiment of the present application.

In one example embodiment, referring to FIG. 4, the adjustment module 320 may comprise:

a determination unit 321, configured to determine area difference related information according to the at least two contact areas; and an adjustment unit 322, configured to, in response to that the area difference related information satisfies a second predetermined condition, adjust the input mode of the device.

The area difference related information may be multiple area differences corresponding to the at least two contact areas, for example, an area difference corresponding to each two contact areas between the gripping hand and the side face; the area difference related information may also be the variance of the multiple area differences.

Figure 5:
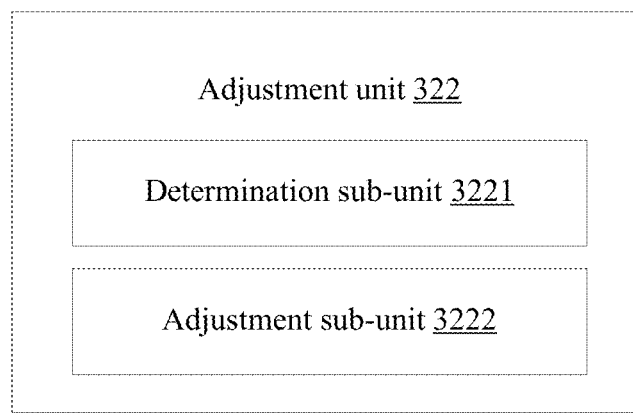
FIG. 5 is a module diagram of the adjustment unit in one example embodiment of the present application.

In one example embodiment, referring to FIG. 5, the adjustment unit 322 comprises:

a determination sub-unit 3221, configured to determine a maximum area difference according to the area difference related information; and an adjustment sub-unit 3222, configured to, in response to that the maximum area difference is greater than a threshold, adjust the input mode of the device.

The determination sub-unit 3221 may select the maximum one from the multiple area differences as the maximum area difference.

The adjustment sub-unit 3222 may adjust the input mode of the device in the event that the maximum area difference is greater than a threshold. That is to say, if the area difference of any two contact areas between the gripping hand and the side face is great enough, it is considered that the corresponding condition is satisfied, and then it is inferred that it is inconvenient for the user to make current input and it is necessary to adjust the input mode.

In another example embodiment, the adjustment unit 322 is configured to, in response to that a classification result of the area difference related information based on a classifier is that it is necessary to adjust the input mode of the device, adjust the input mode of the device.

In the example embodiment, in essence, the area difference related information is classified based on a classifier, and a classification result is obtained, the classification result comprising: it is necessary to adjust the input mode of the device, or it is not necessary to adjust the input mode of the device. In the event that the classification result is that it is necessary to adjust the input mode of the device, the input mode of the device is adjusted.

The classifier may be generated based on training data of the user, for example, in the training stage, contact areas between the gripping hand of the user and the side face within a period of time are recorded, multiple area differences and/or the variance of the multiple area differences are obtained through calculation, and then the multiple area differences and/or the variance of the multiple area differences as well as a corresponding classification mark are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

Figure 6:
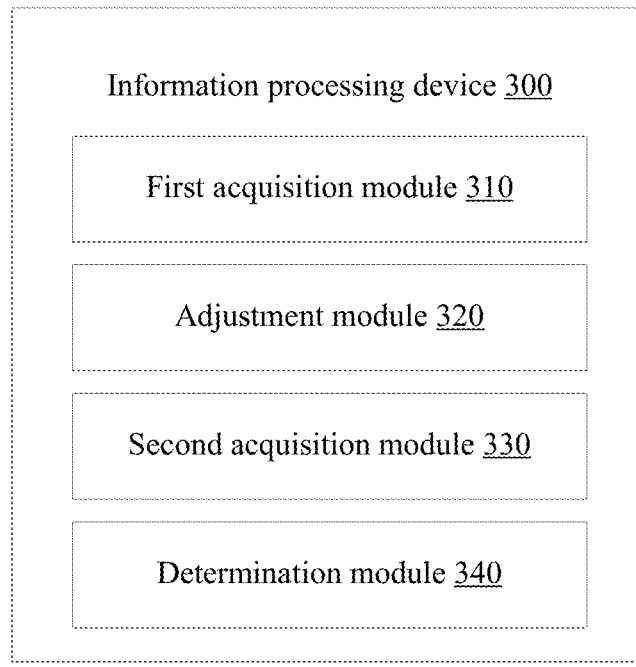
FIG. 6 is a module diagram of the information processing device in one example embodiment of the present application.

In another example embodiment, referring to FIG. 6, the device 300 further comprises:

a second acquisition module 330, configured to acquire at least two touch-sensitive positions corresponding to the touch-sensitive input operation; and a determination module 340, configured to determine touch-sensitive distance related information according to the at least two touch-sensitive positions; and the adjustment unit 322 is configured to, in response to that a classification result of the area difference related information and the touch-sensitive distance related information based on a classifier is that it is necessary to adjust the input mode of the device, adjust the input mode of the device.

A main difference between the example embodiment and the previous example embodiment is that the classifier increases classification on the touch-sensitive distance related information.

The touch-sensitive distance related information may comprise the distance between each two in the at least two touch-sensitive positions, which, in essence, reflects the size of the region that the user needs to touch currently; evidently, the greater the distance is, the greater the region is, and correspondingly, it is more possible that the user encounters inconvenient input; on the contrary, if the distance is smaller, for example, the user clicks one position multiple times, the user generally may not encounter inconvenient input (even if it is inconvenient, the user may also easily overcome it through one hold adjustment, and generally it is not necessary to adjust the input mode). Therefore, in the example embodiment, the movement distance related information and the touch-sensitive distance related information are classified at the same time, and the classification result may be more accurate.

In the example embodiment, the classifier may also be generated based on training data of the user, for example, in the training stage, contact areas between the gripping hand of the user and the side face within a period of time are recorded, multiple area differences are obtained through calculation, touch-sensitive positions of the user for the touch screen within the period of time are recorded at the same time, the touch-sensitive distance between each two touch-sensitive positions are obtained through calculation, and then the multiple area differences and/or the variance of the multiple area differences, the touch-sensitive distances as well as a corresponding classification mark are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

As stated previously, it is feasible to obtain the area difference related information according to the at least two contact areas between the gripping hand and the side face in different times, and then it is feasible to determine whether it is necessary to adjust the input mode currently based on a pre-trained classifier. It can be considered that the area difference related information directly decides whether it is necessary to adjust the input mode, and at the same time, the at least two contact areas between the gripping hand and the side face of the device in different times decide the area difference related information. Therefore, in one example embodiment, it is feasible to determine whether it is necessary to adjust the input mode directly according to the at least two contact areas and the corresponding classifier. In the example embodiment, the adjustment module 320 is configured to, in response to that a classification result of the at least two contact areas based on a classifier is that it is necessary to adjust the input mode of the device, adjust the input mode of the device.

In the example embodiment, the classifier may also be generated based on training data of the user, for example, in the training stage, contact areas between the gripping hand of the user and the side face within a period of time are recorded, and corresponding classification marks are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

Figure 7:
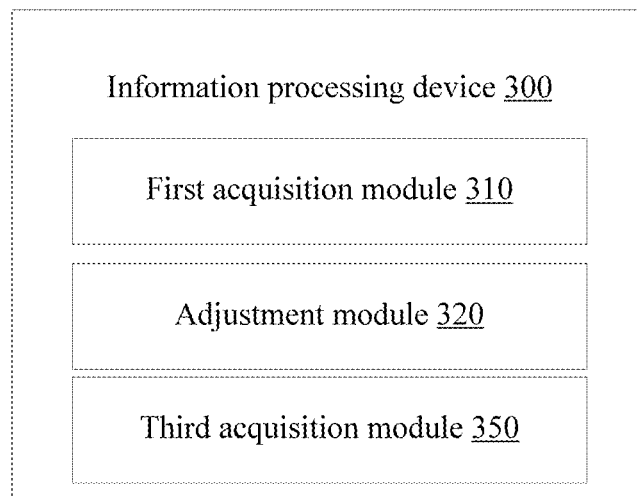
FIG. 7 is a module diagram of the information processing device in another example embodiment of the present application.

As stated previously, the touch-sensitive distance related information may also affect accuracy of the classification result, and the touch-sensitive positions decide the touch-sensitive distance related information; in another example embodiment, referring to FIG. 7, the device 300 further comprises:

a third acquisition module 350, configured to acquire at least two touch-sensitive positions corresponding to the touch-sensitive input operation; and the adjustment module 320 is configured to, in response to that a classification result of the at least two contact areas and the at least two touch-sensitive positions based on a classifier is that it is necessary to adjust the input mode of the device, adjust the input mode of the device.

In the example embodiment, the classifier may also be generated based on training data of the user, for example, in the training stage, contact areas between the gripping hand of the user and the side face within a period of time are recorded, touch-sensitive positions of the user's control hand for the touch screen within the period of time are recorded at the same time, and then the contact areas, the touch-sensitive positions as well as a corresponding classification mark are taken as a set of training data. If the user encounters inconvenient input within the period of time, the corresponding classification mark is that it is necessary to adjust the input mode of the device; if the user does not encounter inconvenient input within the period of time, the corresponding classification mark is that it is not necessary to adjust the input mode of the device. Similarly, it is feasible to obtain multiple sets of training data based on records of multiple time periods, and then it is feasible to obtain the classifier through training based on a training model such as a SVM or a decision tree.

Under some circumstances, after the user performs the touch-sensitive input operation, in a next period of time, it is not necessary to input information; in this case, if the input mode of the device is adjusted, display is not necessary. Therefore, in one example embodiment, the adjustment module 320 is configured to, in response to that the at least two contact areas satisfy the first predetermined condition and that input receiving state information of the device satisfies a third predetermined condition, adjust the input mode of the device.

The input receiving state information may be directly acquired from the device, which reflects whether the device is preparing to receive user input currently. For example, the device currently displays one input region, and evidently, the device is preparing to receive user input currently; on the contrary, if the device is currently in a lock-screen state, the device generally does not prepare to receive user input.

In the example embodiment, the third predetermined condition may be that the input receiving state information displays that the device is preparing to receive user input currently.

One application scenario of the information processing method and device according to the embodiment of the present application may be as follows: a user, in the process of taking a bus, wants to log in to a certain website through a large-screen mobile phone, then the user pulls the handrail with one hand and grips the mobile phone with the other hand and input some personal information through a touch phone screen to complete registration, the mobile phone displays information of the website in full screen, when the user's control finger cannot reach a region to be touched, the user naturally changes the gripping gesture, the mobile phone detects the change of the contact area between the user's gripping hand and the side face of the mobile phone, determines that current input is inconvenient to the user, and then opens a voice input function, and the user conveniently completes website registration through voice input.

Figure 8:
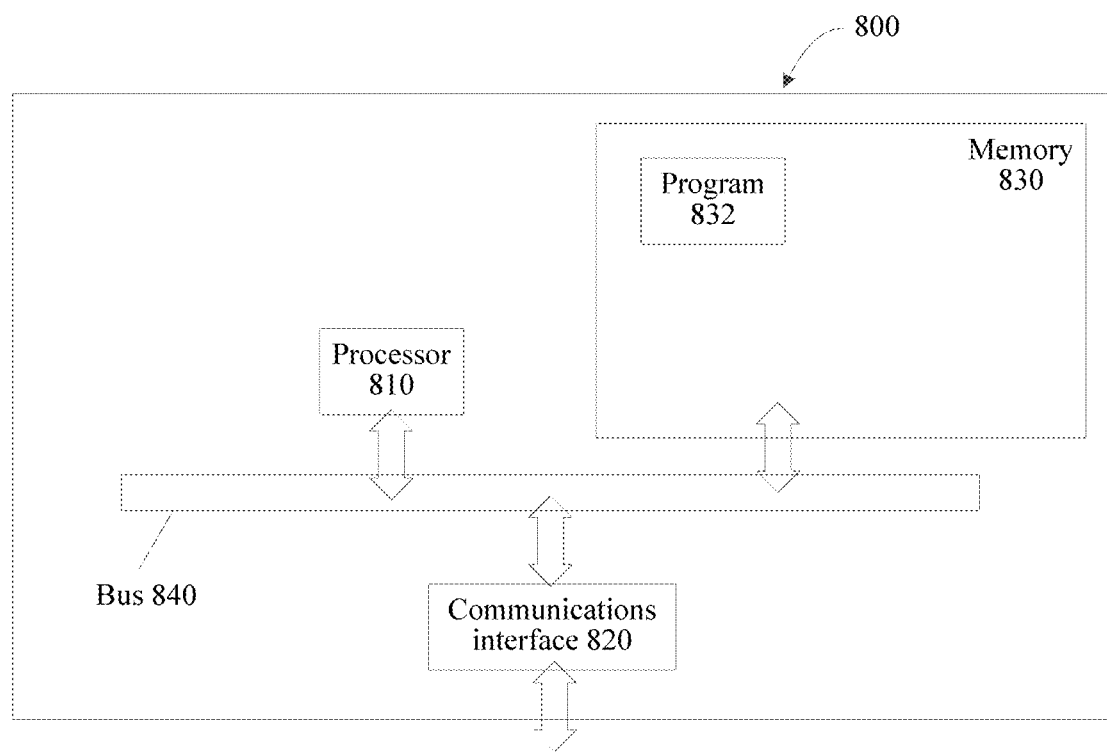
FIG. 8 is a schematic diagram of a hardware structure of the user equipment according to an example embodiment of the present application.

A hardware structure of a user equipment in one embodiment of the present application is as shown in FIG. 8. The specific embodiment of the present application does not define specific implementation of the user equipment. Referring to FIG. 8, the equipment 800 may comprise:

a processor 810, a communications interface 820, a memory 830, and a communications bus 840.

The processor 810, the communications interface 820, and the memory 830 communicate with each other by using the communications bus 840.

The communications interface 820 is configured to communicate with other network elements.

The processor 810 is configured to execute a program 832, and specifically, may implement relevant steps in the method embodiment shown in FIG. 1.

Specifically, the program 832 may comprise program code, the program code comprising a computer operation instruction.

The processor 810 may be a central processing unit (CPU), or an application specific integrated circuit (ASIC), or one or more integrated circuits configured to implement the embodiments of the present application.

The memory 830 is configured to store the program 832. The memory 830 may comprise a high-speed random access memory (RAM), or may also comprise a non-volatile memory, for example, at least one magnetic disk memory. The program 832 may be specifically configured to perform the following steps:

in response to that a user performs a touch-sensitive input operation on a touch screen of a device, acquiring at least two contact areas between a gripping hand of the user and a side face of the device in different times; and at least in response to that the at least two contact areas satisfy a first predetermined condition, adjusting an input mode of the device.

For specific implementation of the steps in the program 832, reference may be made to corresponding description in the corresponding steps or modules in the embodiments, and no further details are provided herein again. A person skilled in the art may clearly know that, for the purpose of convenient and brief description, for a detailed working process of the foregoing device and modules, reference may be made to a corresponding process in the foregoing method embodiments, and no further details are provided herein again.

A person of ordinary skill in the art may be aware that, with reference to the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a controller, a network device, or the like) to perform all or a part of the steps of the methods described in the embodiments of the present application. The foregoing storage medium comprises: any medium that can store program code, such as a USB flash drive, a removable hard disk, a read-only memory (ROM, Read-Only Memory), a RAM, a magnetic disk, or an optical disc.

The foregoing example embodiments are merely used for describing the present application, rather than limiting the present application. A person of ordinary skill in the art may made various changes and modifications without departing from the spirit and scope of the present application, and therefore, all equivalent technical solutions shall belong to the scope of the present application, and the protection scope of the present application shall be subject to the claims.

What is claimed is:

1. A method, comprising:
   in response to determining that one gripping hand of a user identity has performed a touch-sensitive input operation for different positions of a touch screen of a device comprising a processor, acquiring, by the device, contact areas between the one gripping hand of the user identity and one side face of the device at different times, wherein the one side face of the device is any face of the device except a front face and a back face of the device; and
   at least in response to determining that the contact areas satisfy a first predetermined condition, adjusting an input mode of the device, wherein the adjusting the input mode of the device comprises:
     determining area difference related information according to the contact areas, wherein the area difference related information comprises at least one of multiple area differences corresponding to the contact areas or a variance of the multiple area differences,
     determining a maximum area difference of the one gripping hand according to the area difference related information; and
     in response to determining that the maximum area difference is greater than a threshold, performing the adjusting the input mode of the device.

2. The method of claim 1, wherein the adjusting the input mode of the device further comprises:
   in response to determining, based on a classifier, that a classification result of the area difference related information indicates to adjust the input mode of the device, performing the adjusting the input mode of the device.

3. The method of claim 1, further comprising:
   acquiring touch-sensitive positions corresponding to the touch-sensitive input operation; and
   determining touch-sensitive distance related information according to the touch-sensitive positions,
   wherein the adjusting the input mode of the device further comprises:
     in response to determining, based on a classifier, that a classification result of the area difference related information and the touch-sensitive distance related information indicates to adjust the input mode of the device, performing the adjusting the input mode of the device.

4. The method of claim 1, wherein the adjusting the input mode of the device further comprises:
   in response to determining, based on a classifier, that a classification result of the contact areas indicates to adjust the input mode of the device, performing the adjusting the input mode of the device.

5. The method of claim 1, further comprising:
   acquiring touch-sensitive positions corresponding to the touch-sensitive input operation, and
   wherein the adjusting the input mode of the device further comprises:

in response to determining, based on a classifier, that a classification result of the contact areas and the touch-sensitive positions indicates to adjust the input mode of the device, performing the adjusting the input mode of the device.

6. The method of claim 1, wherein the adjusting the input mode of the device further comprises:
in response to determining that the contact areas satisfy the first predetermined condition and that input receiving state information of the device satisfies a second predetermined condition, adjusting the input mode of the device.

7. The method of claim 1, wherein the adjusting the input mode of the device further comprises:
at least one of adjusting an input manner or adjusting an input region of the device.

8. A device, comprising:
a memory that stores executable modules; and
a processor, coupled to the memory, that executes or facilitates execution of the executable modules, the executable modules comprising:
a first acquisition module configured to, in response to a first determination that one gripping hand of a user has performed a touch-sensitive input operation for different positions of a touch screen of a device, acquiring at least two contact areas between the one gripping hand of the user and one side face of the device corresponding to different times, wherein the one side face of the device is any face of the device except a front face and a back face of the device; and
an adjustment module configured to, at least in response to a second determination that the at least two contact areas satisfy a first predetermined condition, adjusting an input mode of the device,
wherein the adjustment module comprises:
a determination unit configured to determine area difference related information according to the at least two contact areas, wherein the area difference related information comprises at least one of multiple area differences corresponding to the at least two contact areas or a variance of the multiple area differences, and
an adjustment unit configured to, in response to a third determination that the area difference related information satisfies a second predetermined condition, adjust the input mode of the device;
wherein the adjustment unit comprises:
a determination sub-unit configured to determine a maximum area difference of the one gripping hand according to the area difference related information; and
an adjustment sub-unit configured to, in response to a fourth determination that the maximum area difference is greater than a threshold, adjust the input mode of the device.

9. The device of claim 8, wherein the adjustment unit is further configured to, in response to a fourth determination that a classification result of the area difference related information based on a classifier is that the input mode of the device is to be adjusted, adjust the input mode of the device.

10. The device of claim 8, wherein the executable modules further comprise:
a second acquisition module configured to acquire at least two touch-sensitive positions corresponding to the touch-sensitive input operation; and a determination module configured to determine touch-sensitive distance related information according to the at least two touch-sensitive positions; and
wherein the adjustment unit is further configured to, in response to a fourth determination that a classification result of the area difference related information and the touch-sensitive distance related information based on a classifier is that the input mode of the device is to be adjusted, adjust the input mode of the device.

11. The device of claim 8, wherein the adjustment module is further configured to, in response to a third determination that a classification result of the at least two contact areas based on a classifier is that the input mode of the device is to be adjusted, adjust the input mode of the device.

12. The device of claim 8, wherein the executable modules further comprise:
a third acquisition module configured to acquire at least two touch-sensitive positions corresponding to the touch-sensitive input operation, and
wherein the adjustment module is further configured to in response to a third determination that a classification result of the at least two contact areas and the at least two touch-sensitive positions based on a classifier is that the input mode of the device is to be adjusted, adjust the input mode of the device.

13. The device of claim 8, wherein the adjustment module is further configured to, in response to the second determination that the at least two contact areas satisfy the first predetermined condition and that input receiving state information of the device satisfies a second predetermined condition, adjust the input mode of the device.

14. The device of claim 8, wherein the device is included in a user equipment.

15. The device of claim 8, wherein the device is a user equipment.

16. A user equipment, comprising:
a touch screen;
a memory, configured to store at least one instruction;
a processor, configured to execute the at least one instruction stored in the memory, the at least one instruction causing the processor to perform operations, comprising:
in response to a first determination that one gripping hand of a user identity has performed a touch-sensitive input operation for different positions of the touch screen, acquiring at least two contact areas between the one gripping hand determined to be gripping the user equipment and one side face of the user equipment in different times, wherein the one side face of the user equipment is any face of the user equipment except a front face and a back face of the user equipment; and
at least in response to a second determination that the at least two contact areas satisfy a predetermined condition, adjusting an input mode of the user equipment, wherein the adjusting the input mode of the user equipment comprises:
determining area difference related information according to the contact areas, wherein the area difference related information comprises at least one of multiple area differences corresponding to the at least two contact areas or a variance of the multiple area differences,
determining a maximum area difference of the one gripping hand according to the area difference related information; and in response to determining that the maximum area difference is greater than a threshold, performing the adjusting the input mode of the user equipment.

17. The user equipment of claim 16, wherein the adjusting the input mode of the user equipment further comprises:
in response to determining, based on a classifier, that a classification result of the area difference related information indicates to adjust the input mode of the user equipment, performing the adjusting the input mode of the user equipment.

18. The user equipment of claim 16, further comprising:
acquiring touch-sensitive positions corresponding to the touch-sensitive input operation; and
determining touch-sensitive distance related information according to the touch-sensitive positions,
wherein the adjusting the input mode of the user equipment further comprises:
in response to determining, based on a classifier, that a classification result of the area difference related information and the touch-sensitive distance related information indicates to adjust the input mode of the user equipment, performing the adjusting the input mode of the user equipment.

19. The user equipment of claim 16, wherein the adjusting the input mode of the user equipment further comprises:
in response to determining, based on a classifier, that a classification result of the contact areas indicates to adjust the input mode of the user equipment, performing the adjusting the input mode of the user equipment.

20. The user equipment of claim 16, wherein the adjusting the input mode of the device further comprises:
in response to determining that the contact areas satisfy the first predetermined condition and that input receiving state information of the device satisfies a second predetermined condition, adjusting the input mode of the user equipment.

21. The user equipment of claim 16, wherein the adjusting the input mode of the device further comprises:
at least one of adjusting an input manner or adjusting an input region of the user equipment.

* * * * *